Dec. 17, 1968  W. M. CLAPP  3,417,321
INCREASING EFFICIENCY OF SWITCHING-TYPE REGULATOR CIRCUITS
Filed July 13, 1966
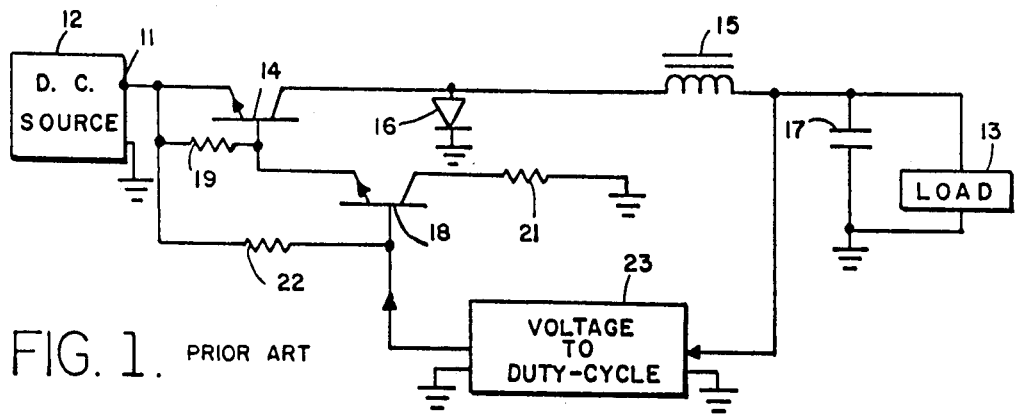
FIG. 1. PRIOR ART
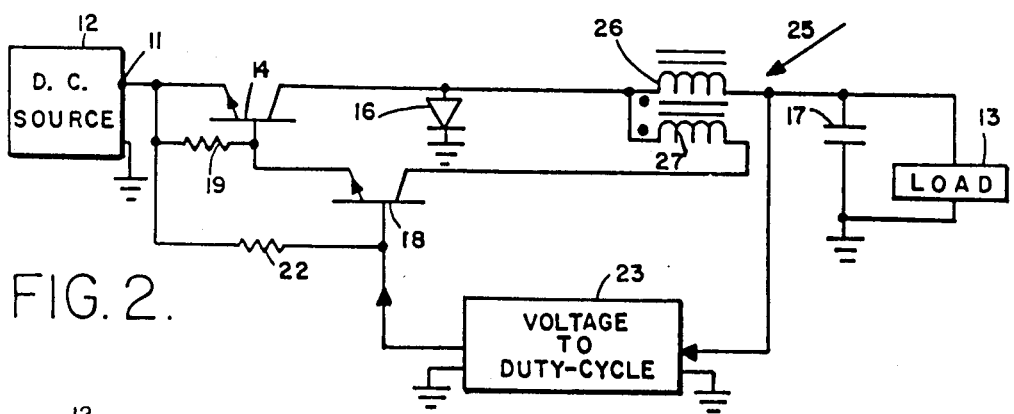
FIG. 2.
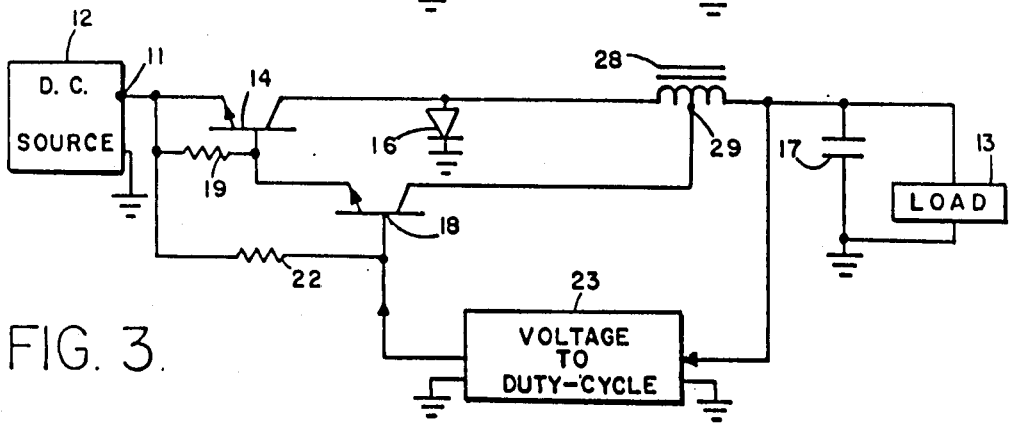
FIG. 3.
INVENTOR.
WILLIAM M. CLAPP
BY
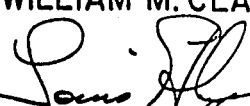
ATTORNEY

United States Patent Office 3,417,321
Patented Dec. 17, 1968

3,417,321
INCREASING EFFICIENCY OF SWITCHING-TYPE REGULATOR CIRCUITS
William M. Clapp, Nashua, N.H., assignor, by mesne assignments, to the United States of America as represented by the National Aeronautics and Space Administration
Filed July 13, 1966, Ser. No. 564,919
6 Claims. (Cl. 323—22)

ABSTRACT OF THE DISCLOSURE

Constant voltage is applied to a load from a regulated power supply via a transistor switch in series connection with the primary winding of a transformer which directly couples the switch between the source and the load. A gating control network for the transistor series switch is connected by the transformer secondary to provide a DC path so that substantially all the current applied to the control network from the input power source is fed to the load. The control network includes a Schmitt trigger which, with its input connected across the load, selectively drives the emitter-collector path of the switching transistor between conducting and nonconducting states with periods varying in response to the magnitude of the input voltage applied thereto. The voltage across the switching transistor when it is conducting remains substantially constant despite variations in load current since the current in the control network is responsive to load current. The transformer inductive network functions as a current transformer to supply load current to the gating network. Efficiency is increased since the control network is in series with the source and the load.

---

The invention described herein was made in the performance of work under a NASA contract and is subject to the provisions of Section 305 of the National Aeronautics and Space Act of 1958, Public Law 85–568 (72 Stat. 435; U.S.C. 2457).

The present invention relates generally to switching series regulators and more particularly to a switching series regulator having a gating control network, wherein substantially all of the current supplied to the control network from an input power source is coupled to the load.

Many prior art switching series regulators exist wherein the period during which current is supplied to a load from a source is variable, depending upon the load voltage magnitude. Generally, the prior art devices require control networks for the transistor or vacuum tube switching element. The control networks are usually connected to the source supplying power to the load and draw considerable amounts of power from the source. In addition to the current supplied to the control circuit by the source, the control network absorbs and dissipates a relatively large amount of power due to heating of resistive elements. The heat dissipated by the resistive elements, in transistor devices, must be removed from the regulator by means of bulky heat sinks, in order for the transistors to operate in a stable manner.

According to the present invention, the efficiency of transistor switching series regulators is increased, while the need for heat sinks is obviated, by connecting the control circuit for the transistor series switch in a manner so that substantially all of the current applied to the control circuit is fed to the load via an inductive network. Efficiency is increased since the control network is in series with the source and load, rather than being in shunt with the source, whereby energization current for the control network is fed to the load rather than being diverted from it. Because the control network is inductively coupled with the load, a low D.C. impedance is presented to the output terminals of the control network. Of course, the low D.C. load impedance minimizes the heat dissipation that is associated with resistive loads.

A further feature of the invention is that the saturation voltage between the emitter and collector of the main switching series transistor is maintained substantially constant during each interval when the transistor is switched into a conducting state, regardless of a current being drawn by the load. The voltage across the switching transistor is maintained constant because the current in the gating control network varies as a function of load current. The gating control network current is controlled in response to the load current because the inductive network functions as a current transformer for supplying the load current to the gating network. Hence, as the load current increases, the current in the gating control network increases, whereby the control network derives a variable bias level for the main switching transistor. The bias voltage for the main switching transistor is such that as the load current increases, the main switching transistor is forward biased to a greater extent and the emitter collector impedance of the main switching transistor is decreased. The decrease in the emitter collector impedance of the main switching transistor is such that the voltage across the transistor remains substantially constant as the load current increases.

It is, accordingly, an object of the present invention to provide a new and improved series regulator of the switching type.

Another object of the invention is to provide a switching regulator having an efficiency in excess of 90 percent.

Still another object of the present invention is to provide a new and improved high efficiency series switching regulator having a control network that feeds substantially all the current supplied to it to the load.

An additional object of the present invention is to provide a new and improved switching series-type regulator wherein power dissipation associated with resistive losses is minimized.

A further object of the present invention is to provide a switching-type regulator, of the series type wherein the need for heat sinks is obviated.

It is still another object of the present invention to provide a new and improved transistor series switching regulator, wherein the voltage across the switching transistor, when it is in the conducting state, remains substantially constant despite variations in load current.

Still an additional object of the present invention is to provide a transistorized series switching regulator wherein transistor operation is stabilized by minimizing heat dissipation without the need for bulky heat sinks, to reduce the size and expense of the regulator.

The above and still further objects, features and advantages of the present invention will become apparent upon consideration of the following detailed description of one specific embodiment thereof, especially when taken in conjunction with the accompanying drawings, wherein:

FIG. 1 is a circuit diagram of a typical prior art switching series regulator;

FIG. 2 is a circuit diagram of a series switching regulator according to a preferred embodiment of the present invention; and FIG. 3 is a circuit diagram of a series switching regulator according to another embodiment of the present invention.

Reference is now made to FIG. 1 of the drawings wherein the negative terminal 11 of D.C. power supply 12 is illustrated as being connected to load 13 through emitter collector path of series switching transistor 14, which is of the NPN type. Connected in series with the collector of transistor 14 and load 13 is smoothing inductor 15, which is shunted on either side by diode 16 and smoothing capacitor 17. The anode of diode 16 is connected to the junction between the collector of transistor 14 and one terminal of inductance 15 to provide a discharge path for the current stored in inductance 15 when transistor 14 is cut off.

The emitter collector path of transistor 14 is alternately driven to conducting saturated and non-conducting states by a transistorized gating network including NPN transistor 18. The emitter of gating control transistor 18 is directly coupled to the base of transistor 14 and is loaded by resistor 19, connected between the emitter and base of transistor 14. The emitter collector energization path for transistor 18 is completed from the negative terminal 11 of source 12 via resistor 19 and resistor 21, connected between the collector of transistor 18 and ground. Negative bias potential is applied to the base of transistor 18 from the negative terminal 11 of D.C. power supply 12 via resistor 22, connected between the base of transistor 18 and the negative terminal.

To control the conducting durations of transistors 14 and 18, voltage to duty-cycle circuit 23 has its input connected across load 13 and smoothing capacitor 17 and supplies its output to the base of transistor 18. Voltage to duty-cycle circuit 23 is of the conventional type, e.g. a Schmitt trigger, whereby it derives a rectangular wave output having alternate periods controlled in response to the voltage across load 13. The period of the positive and negative portions of each cycle of the wave derived by network 23 is variable in response to the magnitude of the input voltage applied to the circuit. In particular, as the input voltage applied to circuit 23 increases and decreases, in a negative manner, the period of the positive portion of each cycle decreases and increases, respectively, while the negative portion of each cycle remains constant. Hence, in response to the voltage across load 13 increasing, because the load impedance increases or the voltage of source 12 becomes greater, circuit 23 drives transistor 18 into a conducting state for a smaller time interval during each cycle of the fixed frequency output of circuit 23. In response to circuit 23 driving transistor 18 into a conducting state, whereby the negative bias applied to the transistor base via resistor 22 is overcome, negative current flows from terminal 11 through resistor 19, the emitter collector path of transistor 18 and resistor 21 to ground. Through the voltage drops of transistor 18 and resistor 21, a positive voltage is developed at the base of transistor 14, relative to the transistor emitter to forward bias transistor 14 into heavy conduction.

In response to series switching transistor 14 being forward biased, a pulse of D.C. current is applied by source 12 to load 13 through the switching transistor and inductance 15. The pulse of negative D.C. current does not flow through diode 16 since the diode is back biased in response to the negative voltage applied to its anode by the collector of transistor 14. While transistors 14 and 18 are forward biased, source 12 applies a significant amount of current through the latter transistor to resistor 21, wherein heating due to I²R power dissipation occurs.

In response to the pulse of current from D.C. source 12, the voltage across load 13 increases, in a negative exponential manner, until the firing voltage of circuit 23 is attained. In response to the firing level of circuit 23 being reached, the circuit derives a negative voltage that is applied to the base of transistor 18. The negative voltage level applied by circuit 23 to the base of transistor 18 drives the emitter collector path of the transistor into a cut-off condition. In response to the emitter collector path of transistor 18 being driven to cut-off, the base and emitter voltage of transistor 14 is decreased substantially to zero whereby the emitter collector path of the latter transistor is cut off. In response to the cut-off condition of transistor 14, the voltage across inductance 15 reverses in phase whereby negative current is supplied by the inductance through load 13 and the cathode-anode path of diode 16. The voltage supplied by inductance 15 to load 13 decreases in an exponential manner until the fixed duration negative portion of the duty-cycle of network 23 has elapsed. In response to the completion of the negative portion of the duty-cycle of network 23, the network derives a positive voltage that is applied to the base of transistor 18, whereby transistor 14 is again rendered in a conducting state. The cycle is continued repeatedly in the manner described so that the voltage across load 13 is stabilized. As the load voltage has a tendency to increase and decrease, the interval during which transistor 14 conducts has a tendency to decrease and increase, respectively, whereby regulation is achieved.

While the circuit of FIG. 1 performs satisfactorily, it has a rather low efficiency; 83.8 percent, being a reasonable value, i.e., 83.8 percent of the power supplied by source 12 to the network is coupled to load 13. Efficiency of the network is effected because current from source 12 is fed through the control network comprised of resistors 19 and 21, as well as transistor 18, shunted between the negative terminal 11 of source 12 and ground. In addition, a significant amount of power supplied by source 12 to the network is dissipated in heat energy by resistor 21. The amount of heat energy radiated by resistor 21 is lost energy and reduces overall efficiency.

According to the present invention, the efficiency of the network of FIG. 1 is increased from a typical value of 83.8 percent to approximately 94 percent by feeding the current from source 12 through the switching transistor gating network back to the load and the I²R power dissipation problems associated with resistor 21 are eliminated. In FIG. 2, the collector of transistor 18 is coupled to load 13 via transformer 25. The primary winding 26 of transformer 25 is connected between the collector of transistor 14 and load 13 in exactly the same manner as inductance 15 is connected between the corresponding elements in FIG. 1.

The secondary winding 27 of transformer 25, however, in addition to being inductively coupled to the primary winding 26, provides a D.C. path between the collector of transistor 18 and the junction between winding 26 and the anode of diode 16. The turns ratio of windings 26 and 27 is such that a relatively large current in primary winding 26 induces a fairly small current in secondary winding 27 so that, in a typical embodiment, $N_{26}/N_{27}$ is on the order of 53/17, wherein $N_{26}$ and $N_{27}$ are the number of turns in transformer windings 26 and 27, respectively. The stated current ratio is necessary to provide the proper current levels through transistors 14 and 18. The windings of transformers 25 are in a direction so that a negative current flowing into the dotted end of winding 26 induces a negative current into winding 27 and vice versa. Hence, in response to transistor 18 being rendered conductive, whereby negative current flows from its collector to the dotted end of winding 27, there is induced in winding 26 a negative current that flows to load 13 in aiding relationship to the current applied to the load by source 12 via transistor 14.

It is desirable to connect the collector of transistor 18 to load 13 through transformer 25, rather than connect the collector directly to the load because the transformer isolates the impedance and voltage levels of load 13 from the collector of transistor 18.

In operation, during the interval when a positive voltage is derived by voltage to duty-cycle network 23, the circuit of FIG. 2 enables current from source 12 to be applied to load 13 through transistors 14 and 18. Current is coupled to load 13 via transformer 14 in precisely the same manner indicated, supra, in conjunction with FIG. 1. Current from source 12 passes through resistor 19 and the emitter collector path of transistor 18 to winding 27. The current supplied through winding 27 induces a current in winding 26, in aiding relationship with the current therein from source 12, whereby load impedance 13 is supplied with current from both transistors 14 and 18. Hence, the efficiency of the network of FIG. 2 is greater than the circuit of FIG. 1 because substantially all of the current supplied to gating transistor 18 is coupled to load 13. Heat dissipation in the circuit of FIG. 2 is decreased relative to the heat dissipated in the network of FIG. 1 because the former circuit has a relatively low D.C. impedance in the collector path of gating transistor 18. The relatively low D.C. impedance in the collector of transistor 18 occurs because windings 26 and 27 have a considerably lower resistance than resistor 21.

In the circuit of FIG. 2, the voltage across winding 26 reverses in phase during the interval when transistors 14 and 18 are cut off. In consequence, negative current flows from winding 26 through load 13 and the cathode-anode path of diode 16. In response to the current flowing in winding 26, there is induced in winding 27 a negative current that flows out of the collector of transistor 18. Since the emitter current of gating transistor 18 is zero, during the interval being considered, winding 27 supplies the gating transistor with a finite emitter cut-off collector current. Because a finite flows out of the collector of transistor 18 during the interval when the emitter collector path of the transistor is cut off, the transistor is more rapidly switched from the non-conducting to the conducting state in response to network 23 switching from a negative to a positive output voltage. Rapid switching of transistor 18 enables the regulator to maintain the voltage across load 13 to within the desired level with great accuracy.

Another feature of the network of FIG. 2 is that the collector emitter saturation voltage of transistor 14 is maintained at a relatively low, constant level despite varying currents being supplied to load 13. The emitter collector saturation voltage of transistor 14 is maintained constant because the collector voltage of transistor 18 varies with load current through winding 26. Increases and decreases in the current through winding 26 are reflected as increased and decreased currents, respectively, in the collector of transistor 18. As the collector current of transistor 18 varies, the voltage drop across resistor 19 varies in a like manner, whereby the base forward bias of transistor 14 is increased and decreased as the collector current of transistor 14 becomes greater and smaller, respectively. In consequence, the emitter collector impedance of switching transistor 14 decreases while the current through the transistor increases, or vice versa, and the saturation voltage of the switching transistor is maintained constant. In contrast, in the embodiment of FIG. 1, the current through resistor 19 is maintained constant during each conducting interval of transistor 18. Hence, a constant forward bias is applied to the base of transistor 14 during each conducting cycle thereof and the impedance between the emitter and collector remains constant so that increases in the current supplied to load 13 result in a greater voltage drop between the emitter and collector of the switched transistor.

Reference is now made to FIG. 3 of the drawings wherein a modification of the network of FIG. 2 is illustrated. In the circuit of FIG. 3, transformer 25 is replaced by autotransformer 28, connected between the collector of transistor 14 and load 13. Autotransformer 28 includes tap 29, connected in D.C. circuit with the collector of transistor 18. Tap 29 is positioned on autotransformer 28 so that an appropriate amount of the voltage developed across the autotransformer is fed to the collector of transistor 18. Hence, the emitter collector path of transistor 18 is supplied with approximately 2 percent of the current supplied to the emitter collector path of transistor 14 to maintain the appropriate current levels in the control and switching transistors, respectively.

The network of FIG. 3 functions in a manner very similar to the circuit of FIG. 2 in that: substantially all of the current supplied to the emitter collector path of transistor 18 from source 12 is fed to load 13; a relatively small D.C. impedance appears in the collector network of transistor 18; and the saturation voltage of transistor 14 between its emitter and collector is maintained substantially constant with substantial changes in the current supplied to load 13. In addition, inductance 28 and tap 29 maintain a low current level in the collector of transistor 18 when the emitter current thereof is cut off. Hence, the network of FIG. 3 includes many of the advantages of the circuit of FIG. 2, without the complexity, weight and expense of a two-coil transformer having a relatively large core.

While I have described several specific embodiments of my invention, it will be clear that variations of the details of construction which are specifically illustrated and described may be made without departing from the true spirit and scope of the invention as defined in appended claims.

I claim:
1. A series regulator circuit for feeding power from a D.C. source to a load comprising:
 (A) a D.C. path for feeding current from said source to said load,
  (1) said path including the emitter collector path of a transistor in series circuit with an isolating impedance,
  (2) said isolating impedance being connected between said transistor and said load and comprising an inductive winding connected in series between said transistor and the load;
 (B) a transistor gate control circuit responsive to a source of gating voltage,
  (1) said control circuit selectively driving the emitter collector path of said transistor between conducting and nonconducting states;
 (C) means for feeding said control circuit with power only from said source; and
 (D) means for coupling said control circuit to said impedance so that substantially all of the current fed to said control circuit from said source is fed to said impedance, said means for coupling comprising a D.C. connection from said control circuit to a tap on said winding.

2. A series regulator circuit for feeding power from a D.C. source to a load comprising:
 (A) a D.C. path for feeding current from said source to said load,
  (1) said path including the emitter collector path of a transistor in series circuit with an isolating impedance,
  (2) said isolating impedance being connected between said transistor and said load and comprising an inductive winding connected in series between said transistor and the load;
 (B) a transistor gate control circuit responsive to a source of gating voltage,
  (1) said control circuit selectively driving the emitter collector path of said transistor between conducting and nonconducting states;
 (C) means for feeding said control circuit with power only from said source; and
 (D) means for coupling said control circuit to said impedance so that substantially all of the current fed to said control circuit from said source is fed to said impedance, said means for coupling comprising another winding inductively coupled to said first named winding, said another winding being connected to induce current from said control circuit into said first named winding.

3. The regulator of claim 2 wherein the relative directions of said windings are such that the current induced in the first named winding by said another winding aids the current flowing in the first named winding from said source and transistor.

4. The regulator of claim 3 wherein one end of the said another winding is connected to said control circuit and the other end is connected to a junction between said first named winding and said transistor.

5. The regulator of claim 4 wherein said control circuit includes means for deriving a signal indicative of the current supplied to said load; and means for applying said signal to said transistor to maintain the voltage across said transistor, during the interval when it is conducting, substantially constant as the current flowing through it varies.

6. A series regulator for feeding power from a D.C. source to a load comprising:
(A) a D.C. path for feeding current from said source to said load,
  (1) said path including the emitter collector path of a first transistor in series with an isolating impedance,
  (2) said impedance being an inductive winding connected between said transistor and said load;
(B) a second transistor having its emitter collector path connected to be responsive to current from said source and supplying substantially all of the current fed to it by said source of said impedance;
(C) means for selectively opening and closing the emitter collector path of said second transistor, said means comprising a variable duty-cycle network responsive to the voltage across the load whereby the duration of the duty-cycle derived by said network varies in response to said voltage;
(D) means for connecting said second transistor to said winding whereby said second transistor derives a signal indicative of the current supplied to said load; and
(E) means connected to said second transistor for opening and closing the emitter collector path of said first transistor in response to the emitter collector path of said second transistor being opened and closed, respectively, and applying said signal to said first transistor to maintain the voltage across said first transistor substantially constant during the interval when it is conducting, as the current flowing through it varies.

References Cited

UNITED STATES PATENTS

| | | | |
|---|---|---|---|
| 3,286,157 | 11/1966 | Leostic | 323—18 |
| 3,304,489 | 2/1967 | Brolin et al. | 323—22 X |
| 3,350,628 | 10/1967 | Gallaher et al. | 323—4 |
| 3,368,139 | 2/1968 | Wuerflein | 323—22 |

LEE T. HIX, *Primary Examiner.*

A. D. PELLINEN, *Assistant Examiner.*

U.S. Cl. X.R.

323—38